United States Patent [19]
Tibbs

[11] Patent Number: 5,708,350
[45] Date of Patent: Jan. 13, 1998

[54] RECHARGING METHOD AND TEMPERATURE-RESPONSIVE OVERCHARGE PROTECTION CIRCUIT FOR A RECHARGEABLE BATTERY PACK HAVING TWO TERMINALS

[75] Inventor: Bobby L. Tibbs, Gainesville, Fla.

[73] Assignee: Eveready Battery Company, Inc., St. Louis, Mo.

[21] Appl. No.: 693,783

[22] Filed: Aug. 9, 1996

[51] Int. Cl.$^6$ .................. H01M 10/46; H01M 10/50
[52] U.S. Cl. .................. 320/35; 320/22; 429/62
[58] Field of Search ............... 320/30, 32, 35, 320/22; 429/62, 97, 99, 112

[56] References Cited

U.S. PATENT DOCUMENTS

| | | | |
|---|---|---|---|
| 3,935,525 | 1/1976 | Elson et al. | 320/35 |
| 4,240,022 | 12/1980 | Kilinskis et al. | 320/23 |
| 4,297,630 | 10/1981 | Mullersman | 320/35 |
| 4,513,238 | 4/1985 | Orban | 320/23 |
| 4,560,915 | 12/1985 | Soultanian | 320/35 |
| 4,686,444 | 8/1987 | Park | 320/31 |
| 5,252,411 | 10/1993 | Yokokawa et al. | 429/62 |
| 5,254,933 | 10/1993 | Lin | 320/35 |
| 5,302,887 | 4/1994 | Ishiguro et al. | 320/32 |

*Primary Examiner*—Peter S. Wong
*Assistant Examiner*—Patrick B. Law
*Attorney, Agent, or Firm*—Robert W. Welsh

[57] ABSTRACT

An overcharge protection circuit for a battery pack and a method of recharging a battery pack in which a charging adaptor having two charging terminals may be used for a metal hydride battery pack, or the like, despite the fact that such a charging adaptor is responsive to a detected change in voltage across the two battery pack terminals to terminate a high rate of charging. The overcharge protection circuit senses the temperature of the cells in the battery pack and, when the sensed cell temperature reaches a threshold temperature, adjusts the voltage appearing across the battery pack terminals to exceed the change in voltage to which the charging adaptor responds by terminating a high rate of charging.

23 Claims, 5 Drawing Sheets

5,708,350

RECHARGING METHOD AND TEMPERATURE-RESPONSIVE OVERCHARGE PROTECTION CIRCUIT FOR A RECHARGEABLE BATTERY PACK HAVING TWO TERMINALS

BACKGROUND OF THE INVENTION

In general, the present invention relates to a rechargeable battery pack. More particularly, the present invention relates to an overcharge protection circuit for a battery pack of the type commonly used in camcorders, cellular telephones, and the like, as well as a method of recharging such battery packs.

Until recently most rechargeable battery packs have included one or more rechargeable nickel cadmium (NiCd) cells and have two external terminals for contacting the positive and negative terminals of a device or of a charging adaptor. Presently, most charging adaptors for charging a rechargeable battery pack are capable of recharging the batteries in the pack at a high charge rate. To ensure that the battery pack is not overcharged, such charging adaptors typically monitor the voltage appearing across the two terminals of the battery pack and change a charging state by terminating charging completely or switching to a trickle charge when a predetermined voltage condition is sensed. For example, as shown in FIG. 1, when a NiCd battery pack is being charged by such a charging adaptor, the voltage across the two terminals of the battery pack gradually rises until it reaches a voltage maximum and then the voltage of the battery pack begins to decrease. Some recent charging adaptors terminate the high rate of charging when the voltage across the terminals of the battery pack reaches a maximum voltage while others terminate the high rate of charging after a predetermined time period regardless of the sensed voltage across the terminals. The most common type of charging adaptor, however, terminates the high rate of charge when the voltage peaks at a maximum and then drops by a predetermined voltage level identified as −dV in FIG. 1.

Although the conventional charging adaptors work well with NiCd battery packs, such charging adaptors do not effectively prevent overcharging of other more recently developed forms of battery packs, such as metal hydride battery packs. FIG. 2 is a graph showing a plot of charging voltage versus time and cell temperature versus time for a metal hydride-type battery pack. As seen by a comparison of the plots of FIGS. 1 and 2, metal hydride battery packs do not tend to drop in voltage after reaching the maximum charging voltage as quickly as a NiCd battery pack. Because these metal hydride-type battery packs take longer to drop in voltage after obtaining the maximum charging voltage, conventional charging adaptors do not terminate a high rate of charge quickly enough for these metal hydride battery packs to prevent overcharging. As shown in FIG. 2, however, the cell temperature of a metal hydride battery pack continues to steadily rise during charging. Thus, it is generally preferred to terminate a high rate of charge of a metal hydride battery pack by sensing the cell temperature and terminating the high rate of charge when the temperature reaches a threshold temperature.

FIG. 3 shows an example of a metal hydride-type battery pack that has been developed. As shown in FIG. 3, the battery pack 7 includes a first terminal 1 coupled to the positive pole of an array 4 of rechargeable metal hydride cells, a second terminal 2 coupled to the negative pole of array 4, and a third terminal 3 coupled to a thermostatic switch 6 and resistor 5. The third terminal 3, thermostatic switch 6 and resistor 5 are incorporated into the battery pack to provide a charging adaptor with an indication of when the temperature within battery pack 7 has reached a threshold level. Thermostatic switch 6 is responsive to the temperature of resistor 5. As current flows through resistor 5, it generates heat. This heat is sensed by thermostatic switch 6, which responds to the heat by changing to the open position as shown in FIG. 3. The charging adaptor used to charge such a battery pack must include three contacts for contacting first, second, and third terminals 1, 2, and 3 of battery pack 7, and must include a circuit for sensing the opened or closed status of thermostatic switch 6 and for changing the charging state that the adaptor is using to charge the battery pack in response to a change in the position of thermostatic switch 6.

Because most charging adaptors currently available include only two contact terminals for contacting the two terminals of a NiCd battery pack, there has been no mechanism for effectively sensing the temperature inside a metal hydride-type battery pack using these common two-terminal charging adaptors. Thus, introducing battery packs into the market such as the metal hydride-type battery pack, which requires the sensing of cell temperature, would require users to purchase costly charging adaptors specially designed for charging such batteries. Further, such specialized charging adaptors may not be suited for charging NiCd battery packs. Thus, there exists a need for a suitable mechanism for enabling both NiCd and metal hydride-type battery packs to be charged using the same charging adaptor.

SUMMARY OF THE INVENTION

The present invention is particularly designed and adapted to solve the above-noted problems by providing an overcharge protection circuit for a rechargeable battery pack having only two contact terminals so as to enable the battery pack to be recharged by a conventional charging adaptor. Another aspect of the present invention is to provide an overcharge protection circuit that is responsive to the temperature of the cells and capable of adjusting the voltage across the two terminals of the battery pack so as to provide the appearance to the charging adaptor that a predetermined voltage drop has occurred whenever the cell temperature exceeds a threshold temperature.

To achieve these and other aspects, the overcharge protection circuit of the present invention comprises a voltage adjusting device coupled between one of the battery pack terminals and a corresponding pole of the rechargeable cells for selectively adjusting the voltage level appearing across the two terminals of the battery pack. The overcharge protection circuit further includes a temperature-responsive switch coupled between the same battery pack terminal and the same pole of the rechargeable cells in parallel with the voltage adjusting device for shorting the voltage adjusting device and providing a direct connection between the battery pack terminal and the pole of the rechargeable cells when the sensed temperature of the rechargeable cells is below a threshold temperature, and for breaking the direct connection between the battery pack terminal and the pole of the rechargeable cells when the sensed temperature reaches the threshold temperature. Thus, when the temperature-responsive switch breaks the direct connection between one of the battery pack terminals and a pole of the rechargeable cells, the voltage adjusting device changes the voltage appearing across the battery pack terminals by an amount exceeding that predetermined change in voltage to which the charging adaptor responds by terminating a high rate of charge. The overcharge protection circuit of the present invention may also include means for directly connecting one of the battery pack terminals to the pole of the rechargeable cells during cell discharge, regardless of the sensed temperature.

The above aspects are further obtained by performing the steps of the method of recharging a battery pack using a charging adaptor having two charging terminals for contacting two respective terminals of the battery pack, the charging adaptor being responsive to a detected change in voltage across the two battery pack terminals to terminate a high rate of charging. The method including the steps of (1) sensing the temperature of the cells in the battery pack and (2) adjusting the voltage appearing across the battery pack terminals to exceed the change in voltage to which the charging adaptor responds by terminating a high rate of charging when the sensed cell temperature reaches a threshold temperature.

DETAILED DESCRIPTION OF PREFERRED EMBODIMENT

Figure 4A:
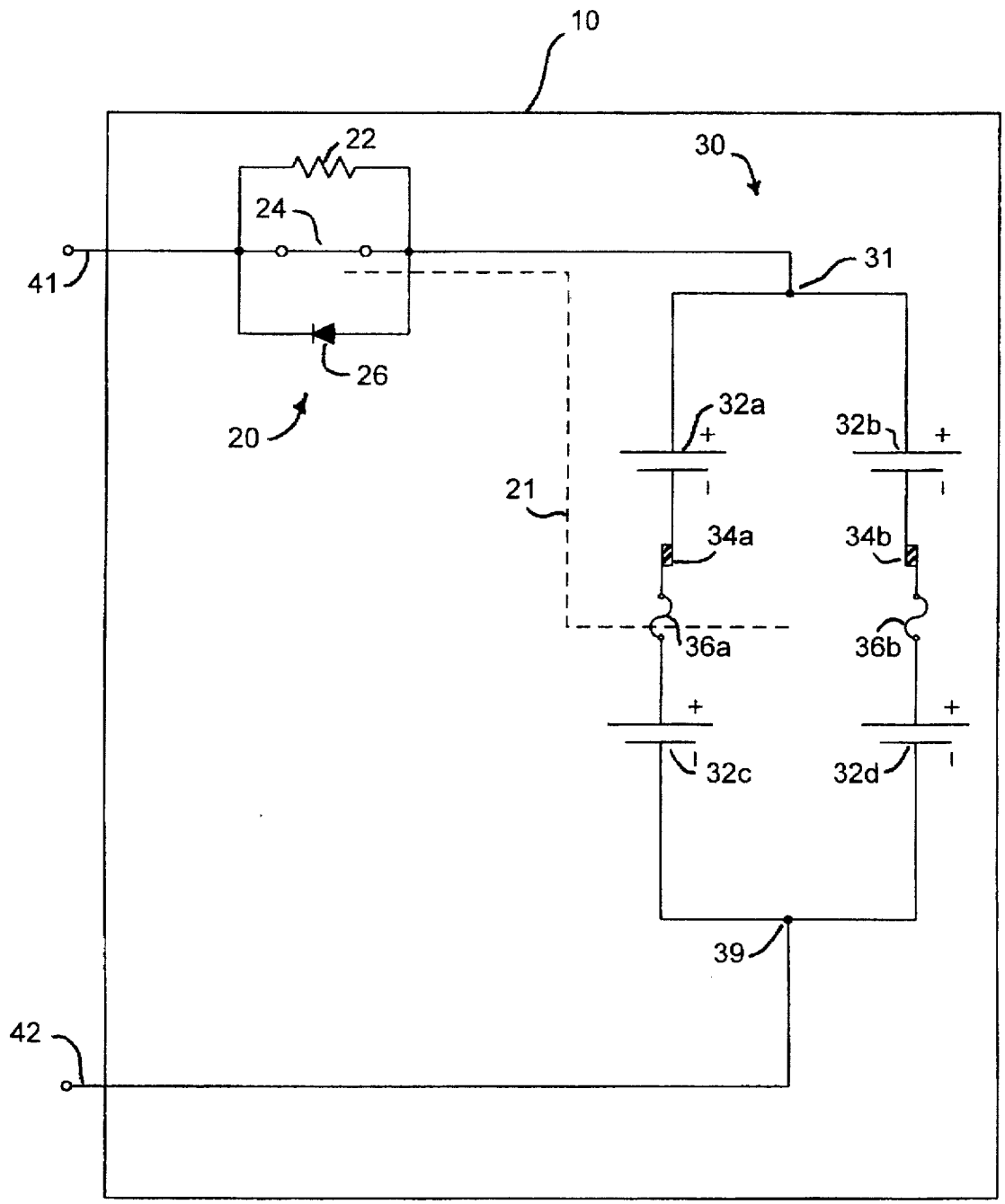
FIG. 4A is an electrical circuit diagram of a battery pack incorporating the overcharge protection circuit of the present invention in which a thermostatic switch is in its normally-closed position.
Figure 4B:
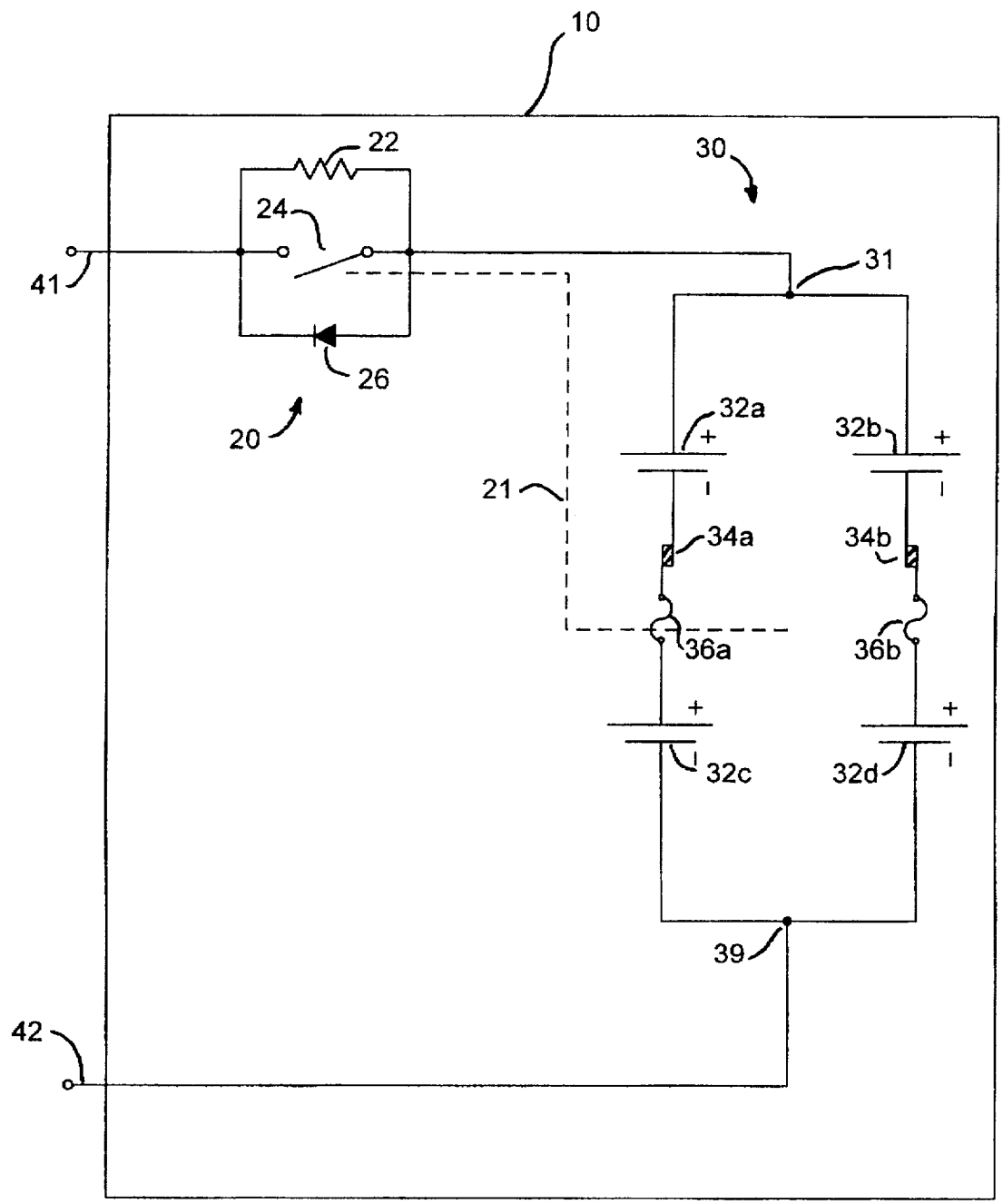
FIG. 4B is an electrical circuit diagram of a battery pack incorporating the overcharge protection circuit of the present invention in which a thermostatic switch is in its open position.

FIGS. 4A and 4B show a battery pack incorporating the overcharge protection circuit 20 of the present invention. The battery pack includes a housing 10 having a first terminal 41 and a second terminal 42, which constitute positive and negative terminals, respectively, of the battery pack. The battery pack primarily includes an array of rechargeable cells 30, which are preferably metal hydride cells, such as a nickel metal hydride. Cell array 30 preferably includes a first cell 32a having its positive terminal connected to a positive pole 31 of the cell array 30, a second cell 32b having its positive terminal coupled to positive pole 31, a third cell 32c having its negative terminal coupled to a negative pole 39 of the cell array 30, and a fourth rechargeable cell 32d also having its negative terminal coupled to negative pole 39. Preferably, cell array 30 further includes a first polyswitch 34a coupled to the negative terminal of first rechargeable cell 32a and coupled to a first terminal of a thermofuse 36a. The second terminal of thermofuse 36a is preferably coupled to the positive terminal of the third rechargeable cell 32c. Similarly, a second polyswitch 34d and a second thermofuse 36b are connected in series between the negative terminal of second rechargeable cell 32b and a positive terminal of fourth rechargeable cell 32d.

The negative pole 39 of cell array 30 is directly connected to the external contact terminal 42 located on the outside of housing 10. The positive pole 31 of cell array 30 is coupled to the positive contact terminal 41 provided on the external surface of housing 10 through overcharge protection circuit 20.

Overcharge protection circuit 20 preferably includes a voltage adjusting device, connected to terminal 41 to selectively adjust the voltage appearing across terminals 41 and 42 to provide the appearance to a charging adaptor contacting terminals 41 and 42, that the voltage across cell array 30 has dropped by an amount to which the charging adaptor will change charging states (i.e., terminate a high rate of charge and begin a trickle charging cycle or terminate charging completely). Preferably, the voltage adjusting device includes a resistor 22 connected between contact terminal 41 and positive pole 31 of cell array 30.

Figure 5:
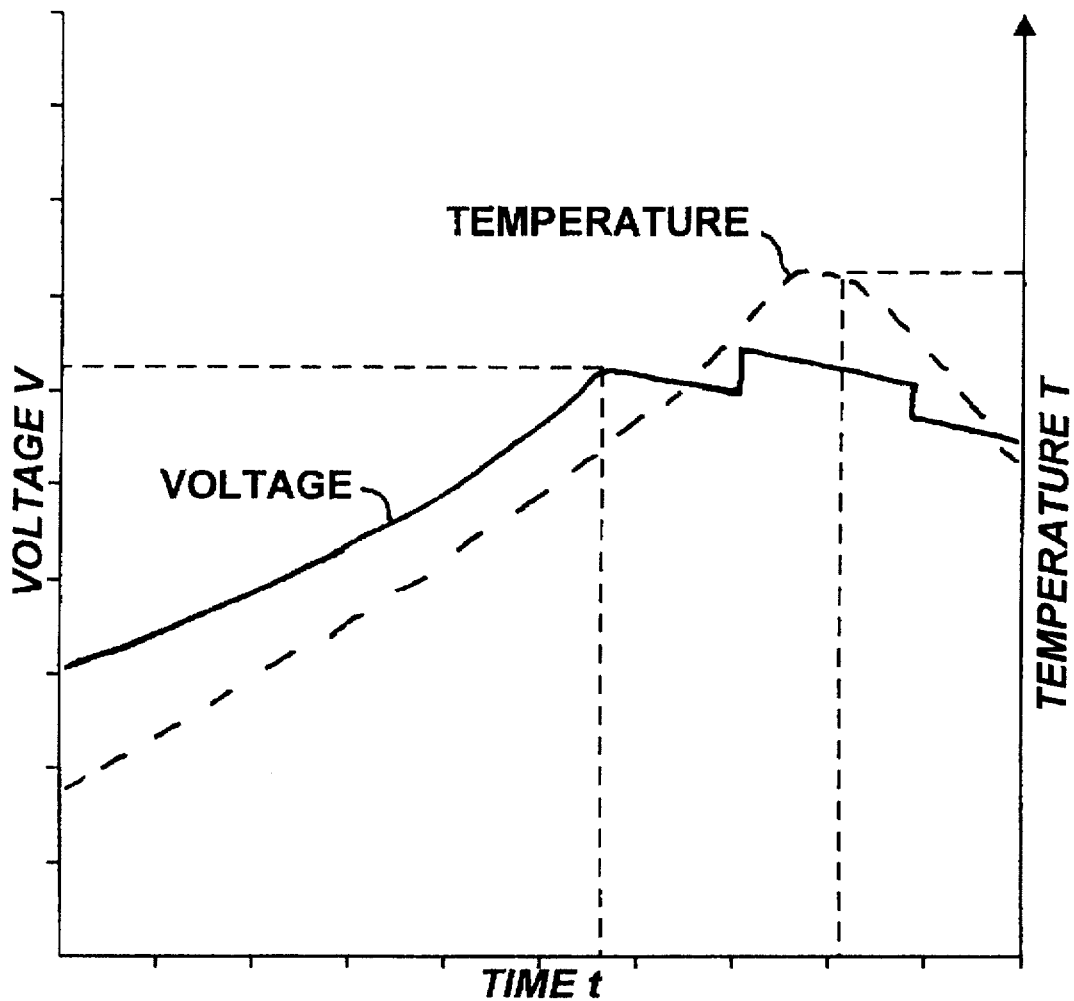
FIG. 5 is a graph showing both charging voltage versus time and cell temperature versus time for a metal hydride-type battery pack.

To selectively adjust the voltage using resistor 22, overcharge protection circuit 20 preferably includes a temperature-responsive switch, such as a thermostatic switch 24, connected in parallel with resistor 22 between contact terminal 41 and positive pole 31 of cell array 30. Thermostatic switch 24 is preferably located in close proximity to cells 32a–d so as to be responsive to the temperature of the cells (as indicated by dashed line 21) and to open or close when the sensed cell temperature exceeds or falls below a threshold temperature. When the cell temperature does not exceed this threshold temperature, switch 24 is normally closed as shown in FIG. 4A thereby providing a direct connection between contact terminal 41 and positive pole 31 while effectively shorting out resistor 22. Thus, when the cell temperature exceeds a threshold temperature, which is particularly set to correspond to the cell temperature at which cell overcharge would begin, the opening of switch 24 as shown in FIG. 4B, causes the charging current to flow through resistor 22 thereby producing a voltage change instantaneously across terminals 41 and 42. In use with some charging adaptors, the opening of switch 24 will result in a voltage drop across terminals 41 and 42 whereas with other charging adaptors the opening of switch 24 will cause the voltage across terminals 41 and 42 to increase as shown in FIG. 5. If the opening of switch 24 produces a voltage increase, resistor 22 acts as a current limiter and the reduced charging current provided to the rechargeable cells is reduce thereby causing an eventual drop in cell temperature. When the cell temperature drops below the temperature threshold that causes switch 24 to close, switch 24 closes thereby resulting in a voltage drop across terminals 41 and 42. The voltage drop that occurs either when switch 24 is first opened or when it is subsequently closed, causes the conventional charging adaptor to perceive the voltage drop as the voltage drop at which a high rate of charge is to be terminated. Thus, overcharge protection circuit 20 effectively tricks a conventional charging adaptor to terminate a high rate of charge even though the requisite voltage drop across cell array 30 may not have occurred. In this manner, a conventional charging adaptor may be caused to terminate the high rate of charge based upon a sensed cell temperature even though it was not designed to do so.

Overcharge protection circuit 20 may also include a diode 26 connected in parallel with resistor 22 and switch 24 so as to provide a direct connection between contact terminal 41 and positive pole 31 when cell array 30 is discharging regardless of the position of switch 24. Thus, by providing diode 26, the discharging of cell array 30 will be otherwise unaffected by overcharge protection circuit 20 even when the cell temperature exceeds the threshold temperature.

Although the present invention has been described with respect to metal hydride battery packs, it will be appreciated by those skilled in the art that the overcharge protection circuit described above could be utilized in any other form of battery pack by which it would be desirable to terminate a high charging rate or terminate charging completely based upon the sensed cell temperature rather than upon the voltage across the cell array. Further, overcharge voltage protection circuit 20 could be configured in a manner different from that disclosed provided that a voltage drop can be made to appear across terminals 41 and 42 when a sensed cell temperature reaches a threshold at which overcharging would begin to occur. In other words, any other configuration may be employed that is capable of performing the steps of the novel recharging method described herein. By providing such an overcharge protection circuit in metal hydride-type battery packs, metal hydride battery packs may be manufactured at low cost while enabling them to compete effectively with NiCd batteries without requiring consumers to purchase special charging adaptors.

Figure 1:
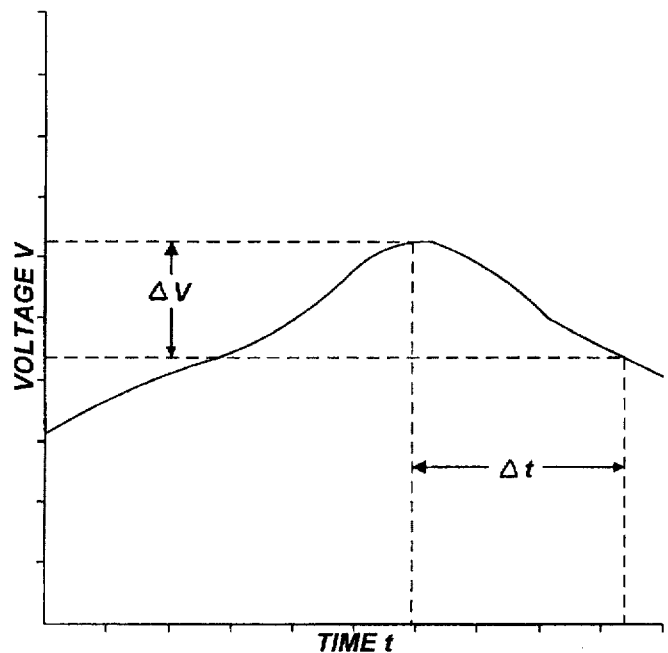
FIG. 1 is a graph showing charging voltage versus time for a typical NiCd battery pack.
Figure 2:
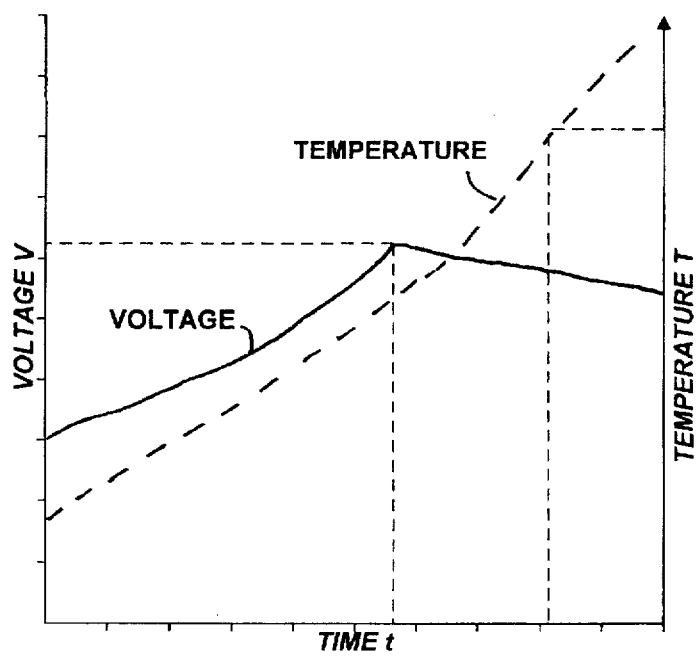
FIG. 2 is a graph showing both charging voltage versus time and cell temperature versus time for a metal hydride-type battery pack.
Figure 3:
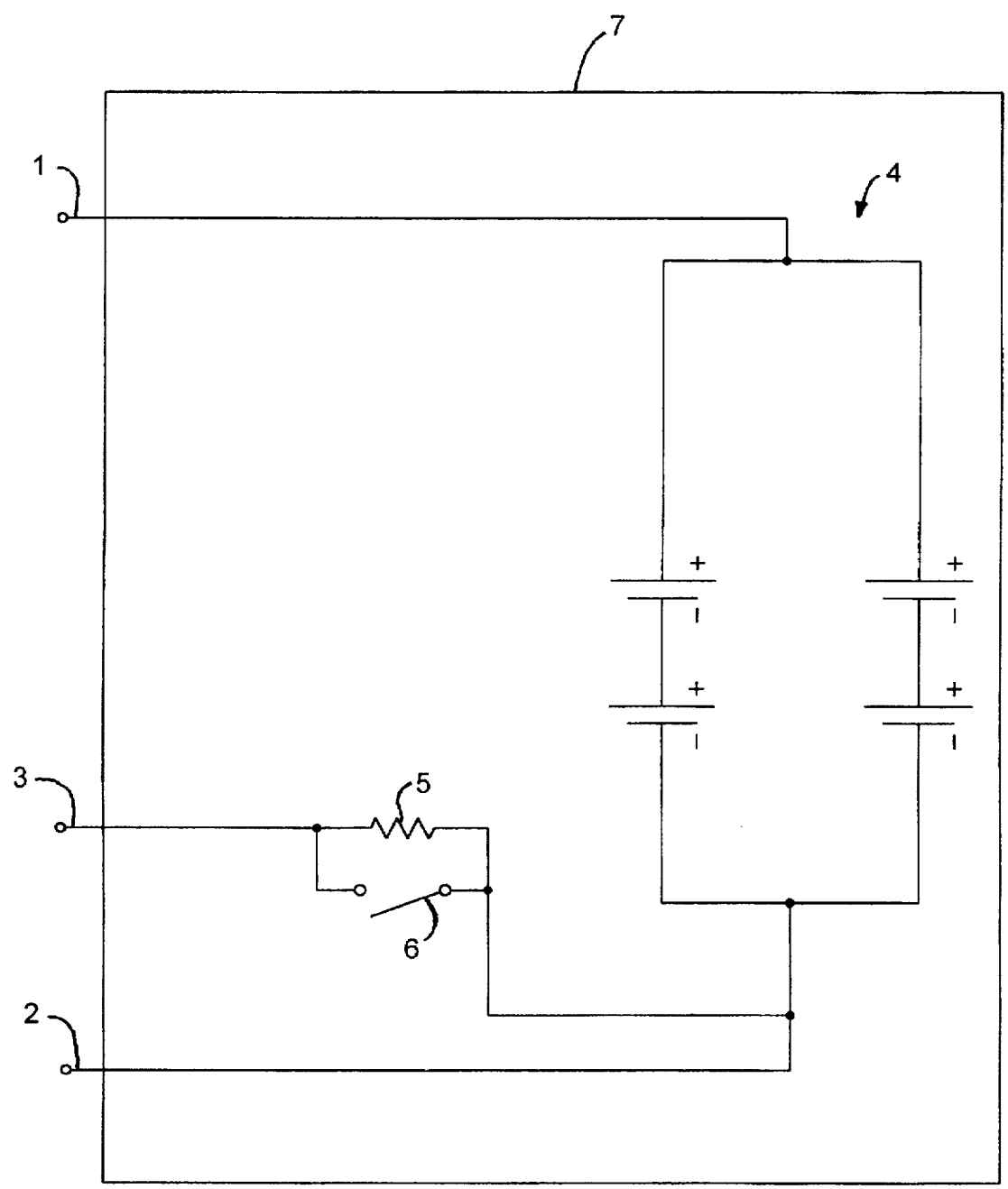
FIG. 3 is an electrical circuit diagram of a three-terminal metal hydride-type battery pack.

Further, the present invention could be implemented in a battery pack having a third terminal for providing an output to a three-terminal charging adaptor that represents a temperature within the battery pack in a manner similar to the battery pack shown in FIG. 3. By providing such a third terminal, the battery pack of the present invention could be charged using either a two-terminal adaptor or a three-terminal adaptor whereas the battery pack shown in FIG. 3 could only be recharged using a three-terminal adaptor.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

The embodiments of the invention in which an exclusive property or privilege is claimed are defined as follows:

1. A rechargeable battery pack for use with a charging adaptor having first and second contacts through which said battery pack may be charged, the charging adaptor changing between high and low charging rates in response to a voltage level detected at the second contact, said battery pack comprising:
   a housing;
   at least one rechargeable cell disposed in said housing and having first and second poles;
   a first terminal located on the exterior of said housing and adapted for contacting said first contact of said charging adaptor, wherein said first terminal is electrically coupled to said first pole of said rechargeable cell;
   a second terminal located on the exterior of said housing and adapted for contacting said second contact of said charging adaptor, wherein said second terminal is electrically coupled to said second pole of said rechargeable cell; and
   a circuit coupled between said second pole of said rechargeable cell and said second terminal for sensing the temperature of said rechargeable cell, wherein, when the sensed temperature reaches a threshold temperature, said circuit adjusts the voltage level at said second terminal by an amount to which said charging adaptor would respond by changing between high and low charging rates for charging said rechargeable cell.

2. The rechargeable battery pack as defined in claim 1, wherein said first pole of said rechargeable cell is a negative pole and said second pole of said rechargeable cell is a positive pole.

3. The rechargeable battery pack as defined in claim 1, wherein said circuit includes:
   a voltage adjusting device coupled to said second terminal for selectively adjusting the voltage level appearing at said second terminal; and
   a temperature-responsive switch connected to said voltage adjusting device for sensing the temperature of said rechargeable cell and for disabling said voltage adjusting device until the sensed temperature of said rechargeable cell has reached the threshold temperature.

4. The rechargeable battery pack as defined in claim 3, wherein said voltage adjusting device is a resistor coupled between said second terminal and said second pole of said rechargeable cell in parallel with said temperature-responsive switch.

5. The rechargeable battery pack as defined in claim 3, wherein said temperature-responsive switch is a thermostatic switch coupled between said second terminal and said second pole of said rechargeable cell.

6. The rechargeable battery pack as defined in claim 1, wherein said rechargeable cell is a metal hydride cell.

7. A rechargeable battery pack for use with a charging adaptor having first and second contacts through which said battery pack may be charged, said battery pack comprising:
   a housing;
   at least one rechargeable cell disposed in said housing and having first and second poles;
   a first terminal located on the exterior of said housing and adapted for contacting said first contact of said charging adaptor, wherein said first terminal is electrically coupled to said first pole of said rechargeable cell;
   a second terminal located on the exterior of said housing and adapted for contacting said second contact of said charging adaptor, wherein said second terminal is electrically coupled to said second pole of said rechargeable cell; and
   a circuit coupled between said second pole of said rechargeable cell and said second terminal for sensing the temperature of said rechargeable cell, wherein, when the sensed temperature reaches a threshold temperature, said circuit adjusts the voltage level at said second terminal by an amount to which said charging adaptor would respond by changing charging states for charging said rechargeable cell, wherein said circuit includes means for directly connecting said second terminal and said second pole of said rechargeable cell during cell discharge regardless of the sensed temperature.

8. The rechargeable battery pack as defined in claim 7, wherein said means for directly connecting said second terminal to said second pole includes a diode coupled between said second terminal and said second pole.

9. A rechargeable battery pack for use with a charging adaptor having first and second contacts through which said battery pack may be charged, said battery pack comprising:
   a housing;
   at least one rechargeable cell disposed in said housing and having first and second poles;
   a first terminal located on the exterior of said housing and adapted for contacting said first contact of said charging adaptor, wherein said first terminal is electrically coupled to said first pole of said rechargeable cell;

a second terminal located on the exterior of said housing and adapted for contacting said second contact of said charging adaptor, wherein said second terminal is electrically coupled to said second pole of said rechargeable cell; and a circuit coupled between said second pole of said rechargeable cell and said second terminal for sensing the temperature of said rechargeable cell, wherein, when the sensed temperature reaches a threshold temperature, said circuit adjusts the voltage level at said second terminal by an amount to which said charging adaptor would respond by changing charging states for charging said rechargeable cell, wherein the voltage level to which the voltage across said first and second terminals is adjusted by said circuit is a voltage level at which said charging adaptor would respond by terminating a high rate of charge of said rechargeable cell.

10. A rechargeable battery pack for use with a charging adaptor having first and second electrical contacts through which said battery pack may be charged, the charging adaptor changing between high and low rate charging in response to a voltage level detected at the second electrical contact, said battery pack comprising:

a housing;

a plurality of rechargeable cells disposed in said housing and coupled together to form a cell array having first and second poles;

a first terminal located on the exterior of said housing and adapted for contacting said first electrical contact of said charging adaptor, wherein said first terminal is electrically coupled to said first pole of said cell array;

a second terminal located on the exterior of said housing and adapted for contacting said second electrical contact of said charging adaptor, wherein said second terminal is electrically coupled to said second pole of said cell array; and a circuit coupled between said second pole of said cell array and said second terminal for sensing the temperature of said cell array, wherein, when the sensed temperature reaches a threshold temperature, said circuit adjusts the voltage level at said second terminal by an amount to which said charging adaptor would respond by terminating high rate charging of said cell array.

11. The rechargeable battery pack as defined in claim 10, wherein said first pole of said cell array is coupled to a negative pole of at least one of said plurality of rechargeable cells and said second pole of said cell array is coupled to a positive pole of at least one of said rechargeable cells.

12. The rechargeable battery pack as defined in claim 10, wherein said plurality of rechargeable cells are metal hydride cells.

13. A rechargeable battery pack for use with a charging adaptor having first and second electrical contacts through which said battery pack may be charged, said battery pack comprising:

a housing;

a plurality of rechargeable cells disposed in said housing and coupled together to form a cell array having first and second poles;

a first terminal located on the exterior of said housing and adapted for contacting said first electrical contact of said charging adaptor, wherein said first terminal is electrically couple to said first pole of said cell array; and a second terminal located on the exterior of said housing and adapted for contacting said second electrical contact of said charging adaptor, wherein said second terminal is electrically coupled to said second pole of said cell array; and a circuit coupled between said second pole of said cell array and said second terminal for sensing the temperature of said cell array, wherein, when the sensed temperature reaches a threshold temperature, said circuit adjusts the voltage level at said second terminal by an amount to which said charging adaptor would respond by terminating high rate charging of said cell array, wherein said circuit includes means for directly connecting said second terminal and said second pole of said cell array during cell discharge regardless of the sensed temperature.

14. An overcharge protection circuit for use in a rechargeable battery pack having first and second terminals adapted to contact corresponding first and second electrical contacts of a charging adaptor that charges the battery pack through the first and second terminals and terminates a high rate of charge when a predetermined change in voltage is detected across the first and second terminals of the battery pack, the battery pack also having at least one rechargeable cell having first and second poles respectively coupled to the first and second battery pack terminals, said overcharge protection circuit comprising:

a voltage adjusting device coupled between the second battery pack terminal and the second pole of the rechargeable cell for selectively adjusting the voltage level appearing at the second battery pack terminal;

a temperature-responsive switch coupled between the second battery pack terminal and the second pole of the rechargeable cell in parallel with said voltage adjusting device for shorting said voltage adjusting device by providing a direct connection between the second battery pack terminal and the second pole of the rechargeable cell when the sensed temperature of said rechargeable cell is below a threshold temperature, and for breaking the direct connection between the second battery pack terminal and the second pole of the rechargeable cell when the sensed temperature reaches the threshold temperature, wherein, when said temperature-responsive switch either breaks or makes the direct connection between the second battery pack terminal and the second pole of the rechargeable cell, said voltage adjusting device changes the voltage appearing across the battery pack terminals by an amount exceeding the predetermined change in voltage to which the charging adaptor responds by terminating a high rate of charge.

15. The overcharge protection circuit as defined in claim 14 and further including means for directly connecting the second battery pack terminal and the second pole of the rechargeable cell during cell discharge regardless of the sensed temperature.

16. The overcharge protection circuit as defined in claim 15, wherein said means for directly connecting the second battery pack terminal to the second pole of the rechargeable cell includes a diode coupled therebetween.

17. The overcharge protection circuit as defined in claim 14, wherein said voltage adjusting device is a resistor.

18. The overcharge protection circuit as defined in claim 14, wherein said temperature-responsive switch is a thermostatic switch.

19. An overcharge protection circuit for use in a rechargeable battery pack having first and second terminals adapted to contact corresponding first and second terminals of a charging adaptor that terminates a high rate of charge when a predetermined change in voltage is detected across the first and second terminals of the battery pack, the battery pack also having an array of rechargeable cells having first and second cell array poles respectively coupled to the first and second battery pack terminals, said overcharge protection circuit comprising:

- a resistor coupled between the first battery pack terminal and the first cell array pole; and
- a thermostatic switch coupled between the first battery pack terminal and the first cell array pole in parallel with said resistor for sensing the temperature of the cell array, wherein said thermostatic switch is closed when the sensed cell array temperature is below a threshold temperature and is open when the sensed cell array temperature is above the threshold temperature,
- wherein a voltage across said resistor changes when said thermostatic switch moves between a closed and open position by an amount exceeding the predetermined change in voltage to which the charging adaptor responds by terminating a high rate of charge.

20. The overcharge protection as defined in claim 19 and further including a diode connected between the first battery pack terminal and the first cell array pole in parallel with said resistor and said thermostatic switch to enable the cell array to discharge directly through the first battery pack terminal regardless of the sensed cell temperature.

21. A method of recharging a battery pack using a charging adaptor having two charging contacts for providing a charging current to two respective terminals of the battery pack, the charging adaptor being responsive to a detected change in voltage across the two battery pack terminals to change a charging state for charging the battery pack, said method comprising the steps of:

sensing the temperature of the cells in the battery pack; and adjusting the voltage appearing across the two battery pack terminals to exceed the change in voltage to which the charging adaptor responds by changing a state of charging of the battery pack when the sensed cell temperature reaches a threshold temperature.

22. The method as defined in claim 21, wherein said step of adjusting the voltage appearing across the battery pack terminals includes adjusting the voltage appearing across the battery pack terminals to exceed a change in voltage to which the charging adaptor responds by terminating a high rate of charge of the battery pack when the sensed cell temperature reaches a threshold temperature.

23. A battery pack comprising:

a housing;

at least one rechargeable cell disposed in said housing, said battery pack having a first pole and a second pole;

a first electrical contact terminal located on an exterior surface of said housing and electrically coupled to said first pole of said rechargeable cell;

a resistor having a first end coupled to said second pole of said rechargeable cell;

a second electrical contact terminal located on an exterior surface of said housing and electrically coupled to a second end of said resistor, said first and second electrical contact terminals being adapted for contacting corresponding contacts of a charging adaptor for charging said rechargeable cell;

a thermostatic switch coupled between said second electrical contact terminal and said second pole of said rechargeable cell, for changing between open and closed states in response to the temperature within said housing, said thermostatic switch normally being in a closed state to provide a direct connection between said second electrical contact terminal and said second pole, and being in an open state when the temperature within said housing reaches a threshold temperature; and means coupled between said second pole of said rechargeable cell and said second electrical contact terminal, for bypassing said resistor during discharge of said rechargeable cell regardless of the temperature within said housing.

* * * * *